United States Patent [19]
Iwasaki

[11] Patent Number: 5,640,235
[45] Date of Patent: Jun. 17, 1997

[54] PHOTOMETRIC DEVICE AND METHOD

[75] Inventor: Hiroyuki Iwasaki, Kanagawa-ken, Japan

[73] Assignee: Nikon Corporation, Tokyo, Japan

[21] Appl. No.: 515,056

[22] Filed: Aug. 14, 1995

[30] Foreign Application Priority Data

Jan. 23, 1995 [JP] Japan ................................. 7-008406

[51] Int. Cl.$^6$ .................................................... G01J 1/42
[52] U.S. Cl. ............................................ 356/218; 250/205
[58] Field of Search ................................. 356/218, 222, 356/225, 418, 419, 224–226; 354/24, 426, 402; 355/33; 250/205, 238; 396/236–238

[56] References Cited

U.S. PATENT DOCUMENTS

| | | | |
|---|---|---|---|
| 4,182,573 | 1/1980 | Yamada et al. | 356/218 |
| 4,247,186 | 1/1981 | Uchidoi et al. | 354/24 |
| 4,332,469 | 6/1982 | Wendland | 356/222 |
| 4,465,354 | 8/1984 | Yuasa | 354/426 |
| 4,737,029 | 4/1988 | Yabusaki et al. | 356/225 |
| 5,136,325 | 8/1992 | Uchiyama et al. | 354/402 |
| 5,327,210 | 7/1994 | Okui et al. | 356/218 |

*Primary Examiner*—Frank Font
*Assistant Examiner*—Michael P. Stafira
*Attorney, Agent, or Firm*—Oliff & Berridge

[57] ABSTRACT

A photometric device includes a photoelectric conversion section to photoelectrically convert the light from an object, output circuits that output information from the photoelectric conversion section, a logarithmic conversion section that logarithmically compresses the output from the output circuit, and a correction section that corrects the output from the output circuit. The correction section corrects the output from the output circuit after it is logarithmically compressed by the logarithmic conversion section. It is possible to obtain accurate photometric results using the photometric device. A simple computation method is used without burdening the microcomputer and memory.

26 Claims, 11 Drawing Sheets

PRIOR ART

FIG.11
PRIOR ART

PHOTOMETRIC DEVICE AND METHOD

BACKGROUND OF THE INVENTION

1. Field of the Invention

The present invention relates to a photometric device to measure the luminance of an object. The photometric device can be used in an auto exposure control of a camera.

2. Description of Related Art

Figure 10:
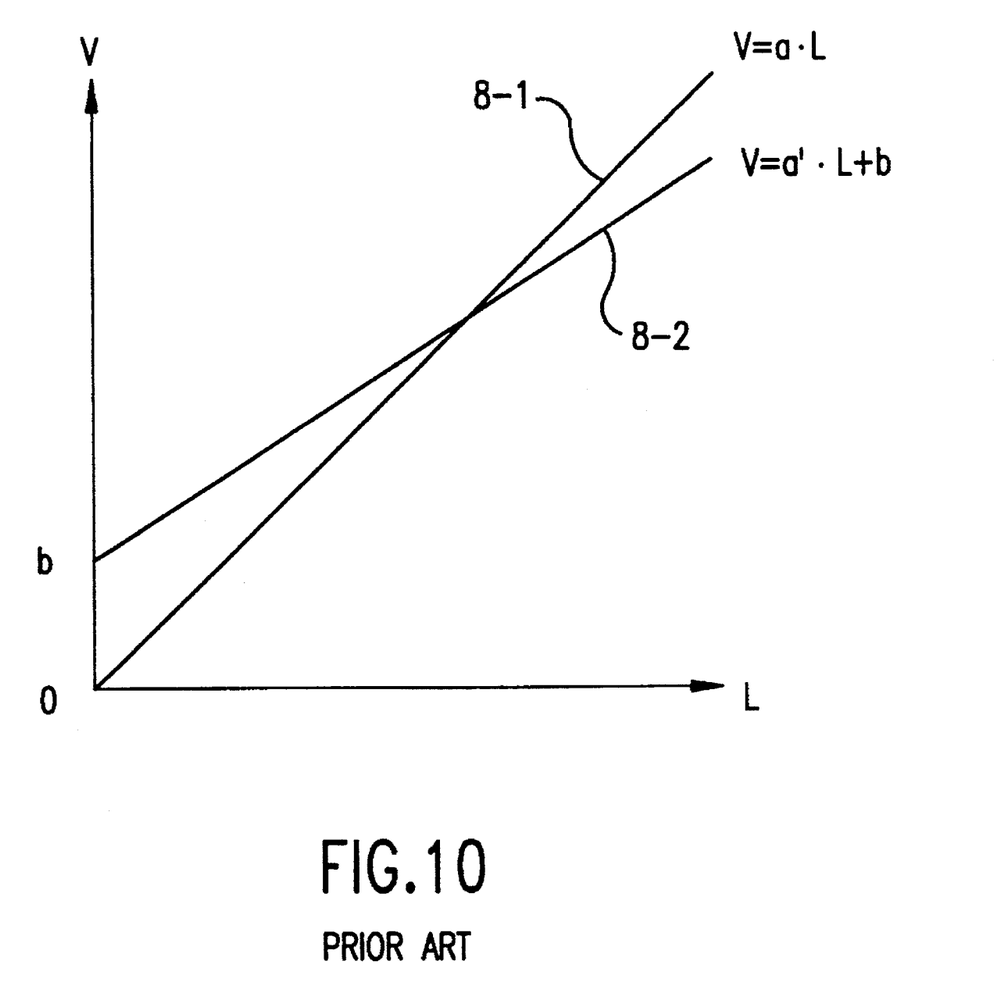
FIG. 10 is a graphical representation of a conventional photometric device's output versus brightness.

FIG. 10 is a graph representing the output characteristic V versus the brightness L for a conventional photometric device. Under ideal conditions, the L v. V graph should show a proportional relationship, as illustrated in curve 8-1. However, due to changes in temperature and power source voltage and the like, the L v. V characteristics deviate from a proportional relationship, as illustrated in curve 8-2. The ideal L v. V characteristic is described by Equation (1), for curve 8-1 and by Equation (2) for curve 8-2.

$$v = a \cdot L \quad (1)$$

$$V' = a' \cdot L + b \quad (2)$$

where a is the slope of the line 8-1, a' is the slope of the line 8-2, and b is the offset of the output characteristic V between line 8-1 and line 8-2.

Therefore, in curve 8-2, the deviation with slope a/a' and offset b, needs to be corrected, based on the obtained value V' from Equation (2). Such a correction can be accomplished using Equation (3).

$$V = (V' - b) \cdot (a/a') \quad (3)$$

Figure 11:
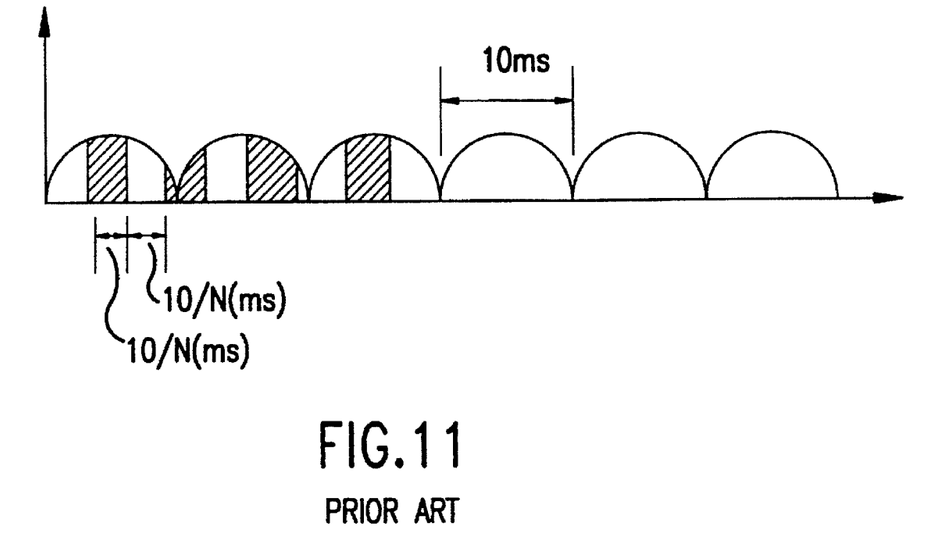
FIG. 11 is an illustration describing a step used by the conventional photometry in FIG. 10.

A conventional photometric device is disclosed in Japanese Unexamined Patent Publication Hei 6-208154. This photometric device, which is illustrated in FIG. 11, conducts photometric at intervals of 10/N ms (milli-second), where N is an odd integer other than 1. The photometric device obtains a final photometric value by averaging the latest N photometric values, so the photometry is not effected by light source flicker or variation.

However, with this and other known photometric methods and devices, the required multiplication and division, required in Equation (3), causes a heavy burden on the control assembly. Computation takes too much time, and thus the photometric is not efficient.

Moreover, with the conventional photometric device of Japanese Unexamined Patent Publication Hei 6-208154, the final photometric value will not be obtained, unless photometry is conducted at least N times. Further, N photometric values have to be stored. Therefore, the conventional photometric device and the associated method place a large burden on the memory. Therefore, the photometry is no longer efficient.

SUMMARY OF THE INVENTION

The invention provides a photometric device capable of simply and accurately computing photometric results. The computation method, using an easy computation method, does not place a heavy burden on the control and memory.

The photometric device according to a preferred embodiment of the invention includes a photoelectric conversion section that converts light reflected from an object to electric signals, an output circuit that outputs data representative of the signals from the photoelectric conversion section, a logarithmic conversion section that logarithmically compresses the output from the output circuit, and a correction section that corrects the output from the output circuit. The correction section corrects the data from the output circuit after the data have been logarithmically compressed by the logarithmic conversion section. The photometric section can comprise accumulation photoelectric elements. Therefore, correction of the output circuit is easily executed and stable photometric values can be readily obtained.

The output circuit can output at least first and second data, including a reference voltage and at least one photometric output the reference voltage and the photometric outputs. The correction section can compute the difference between the data. For example, the output circuit can output a reference voltage and a photometric output from a same terminal before the data are logarithmically compressed. The difference between the reference voltage and the photometric output can be computed before logarithmic compression of the output from output circuits. Therefore, the need to correct an error equivalent to the offset amount is eliminated.

The correction section can correct an output error of the output circuit caused by temperature changes and changes in the voltage of the power source. Further, the correction section can correct sensitivity changes of the photoelectric conversion section caused by temperature. Correction of sensitivity changes due to temperature of the photoelectric conversion section can be performed after logarithmic compression, therefore easily correcting the sensitivity changes.

In order to overcome above-noted problems, the photometric device, according to another preferred embodiment of the invention, comprises a photometric section that conducts photometry on an object and a control section that repeatedly conducts the photometry with a predetermined time interval therebetween. A determination section can determine whether the current photometry is the first photometry since the start-up of a power source. A photometric result computation section outputs the photometric value as the final photometric result, if the photometry is the first photometry. Also, if the photometry is not the first photometry, the photometric result computation section outputs a weighted mean of the previous final photometric result and current photometric value. Therefore, a stable photometry can be executed, using only a small amount of memory.

Correction of the output circuit can be performed after logarithmic compression, thereby reducing the burden on the correction section. Correction of output error due to temperature changes of the output can be performed after logarithmic compression, further permitting the output error to be easily corrected. Also, correction of output error due to power source voltage changes can be performed after logarithmic compression. This also permits the output error to be easily corrected.

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
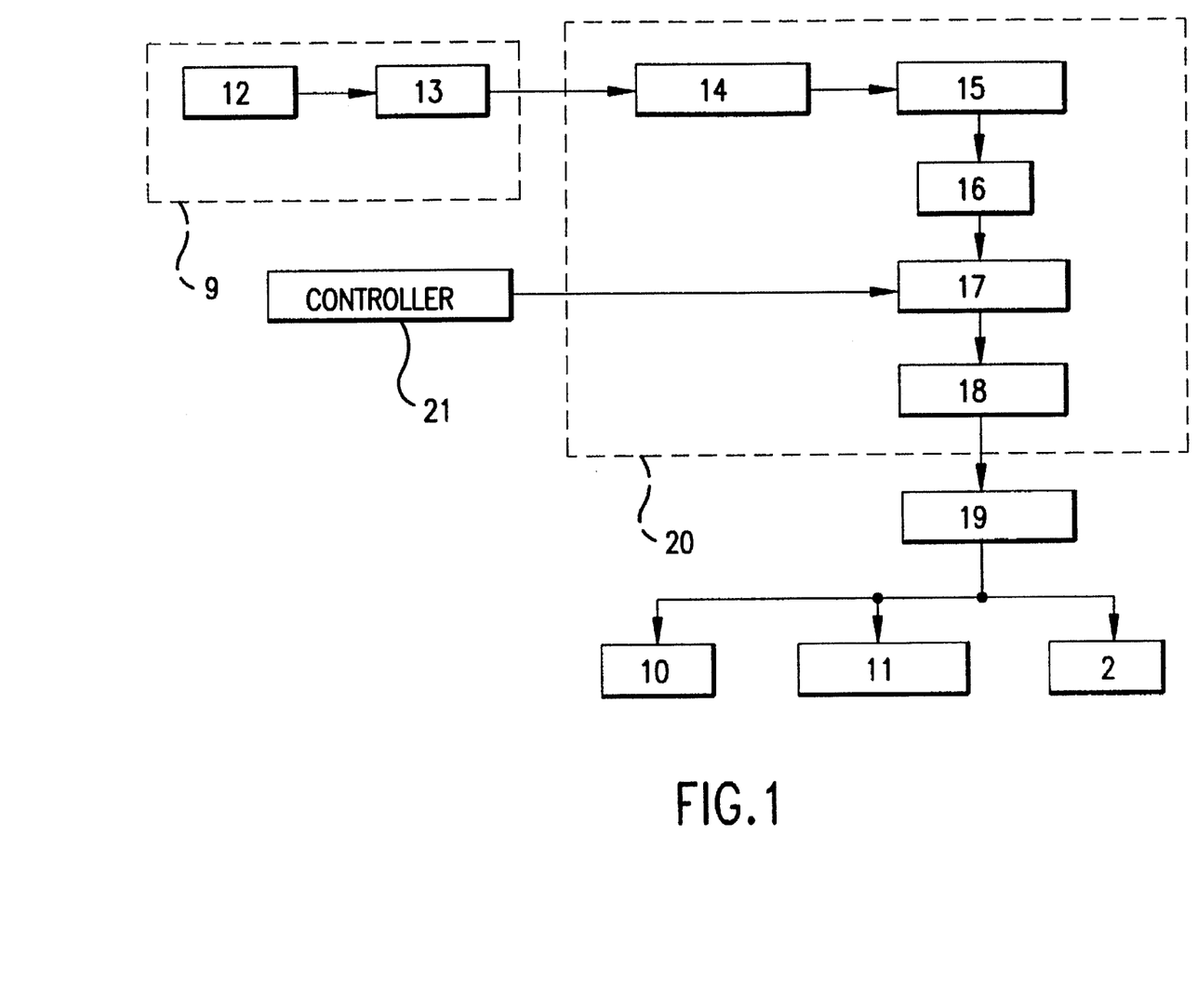
FIG. 1 is a schematic block diagram illustrating a photometric device according to one preferred embodiment of the invention.

FIG. 1 is a schematic block diagram of the photometric device for a camera. The photometric device includes a light receiving element assembly 9, a controller 20, an inside-lens controller 21, an exposure control unit 19, a diaphragm 10, a shutter 11 and a mirror 2.

In the illustrated embodiment, the controllers 20 and 21 can be implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controllers 20, 21 can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controllers 20, 21 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 5–8 can be used as the respective controllers. As shown, a distributed processing architecture is preferred for maximum data/signal processing capability and speed.

The light receiving element assembly 9 includes a photometric section 12 that photoelectrically converts the light reflected from an object to an electric signal and an amplifier unit B. Photometric section 12 outputs a signal representative of the photometric process. The amplifier section 13 converts the photometric section 12 signal to a voltage level and then amplifies the output.

The controller 20 comprises an A/D conversion section 14 that converts the output of the light receiving element assembly 9 to data representative of the signal. A logarithmic conversion section 15 logarithmically compress data from the A/D conversion section 14. Correction section 16 corrects data from the light receiving element assembly 9 (as discussed below) and then inputs the data from the logarithmic conversion section 15 into a luminance computation section 17.

The luminance computation section 17 computes an object field luminance value based on the data from the correction section 16 and the inside-lens controller 21. An exposure computation section 18 then computes a proper exposure value, using an output from the luminance computation section 17.

The controller 20 can operate each of the above sections by execution of a control routine or program, which is written and stored in a memory (not shown). The contents of the control routine will be explained hereafter.

The exposure control unit 19 controls a mirror 2, a diaphragm 10, a shutter 11, and other known elements of an optical system, (not shown), for the photometric device. The exposure control unit 19 controls these elements based on the value output from the exposure computation section 18. The exposure control unit 19 can expose film in the camera.

Figure 2:
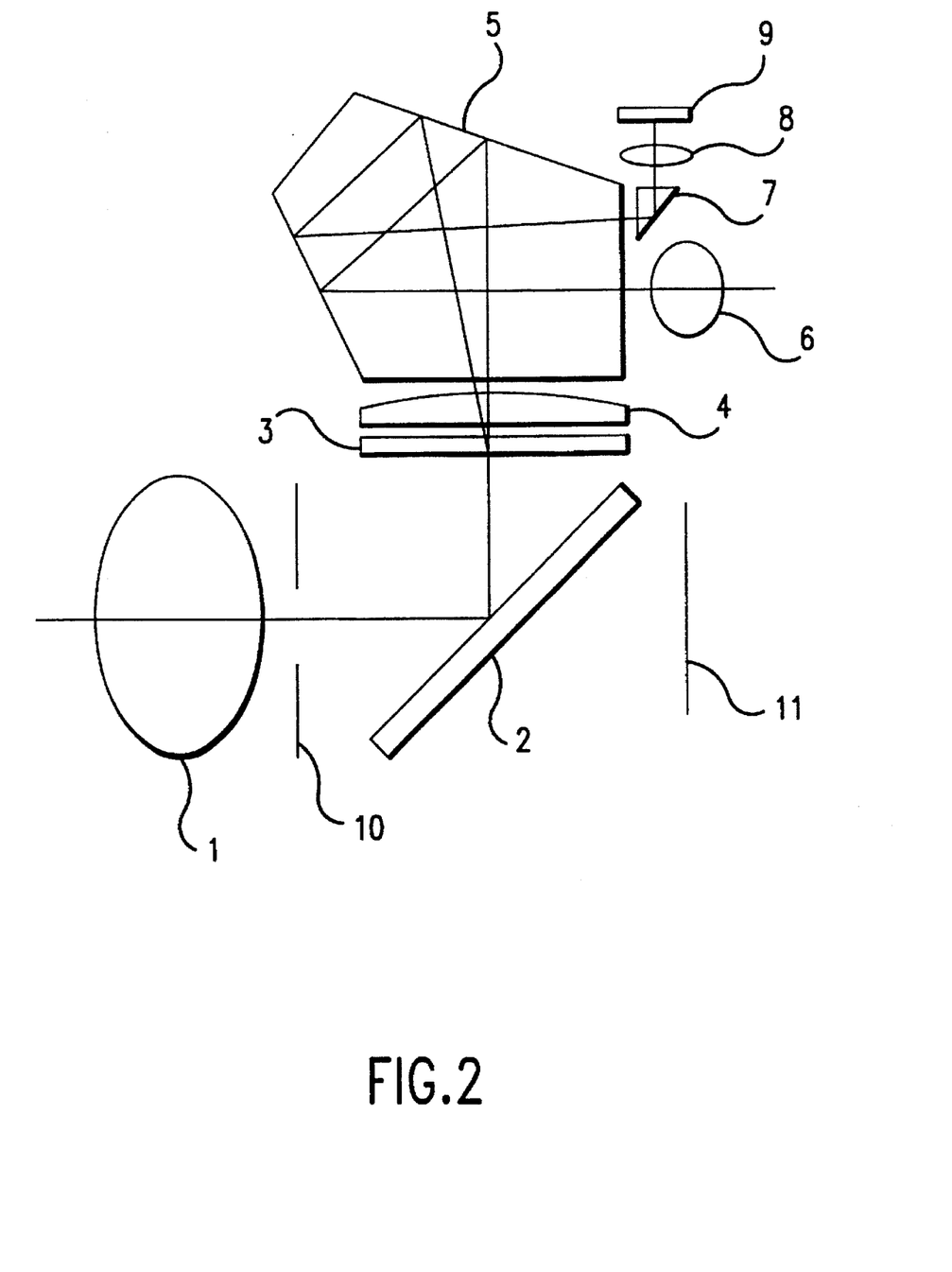
FIG. 2 is a schematic diagram illustrating the optical system of the photometric device.

FIG. 2 is a schematic diagram showing the optical system of the photometric device. The system includes a shooting lens 1. Light rays from the object pass through the shooting lens 1 and reach the photographer's eye via an optical path. The optical path includes a quick return mirror 2, a diffusion screen 3, condenser lens 4, a pentagonal prism 5 and eye lens 6. Some of the light rays, after passing through and being diffused by the diffusing screen 3, reach the light receiving element assembly 9 via an optical path including the condenser lens 4, the pentagonal prism 5, a photometric prism 7 and a photometric lens 8.

Figure 3:
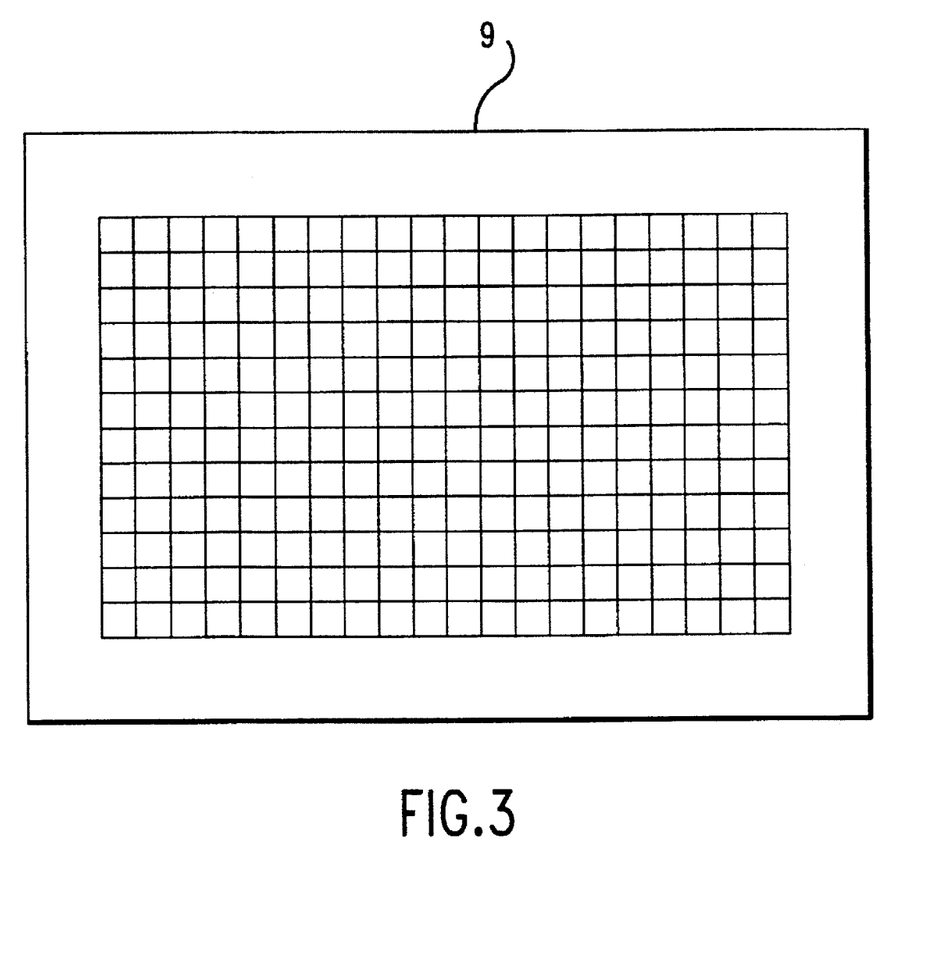
FIG. 3 is a drawing illustrating the division status of the photometric section of the photometric device.

FIG. 3 illustrates the division arrangement used for an object field in the photometric element. Accumulation type sensors such as a CCD (charge coupled device) or other equivalent device can be used for the light receiving element assembly 9. As seen in FIG. 3, the sensor preferably consists of 240 areas, a result of dividing the object field into 12 vertical areas and 20 horizontal areas.

Figure 4:
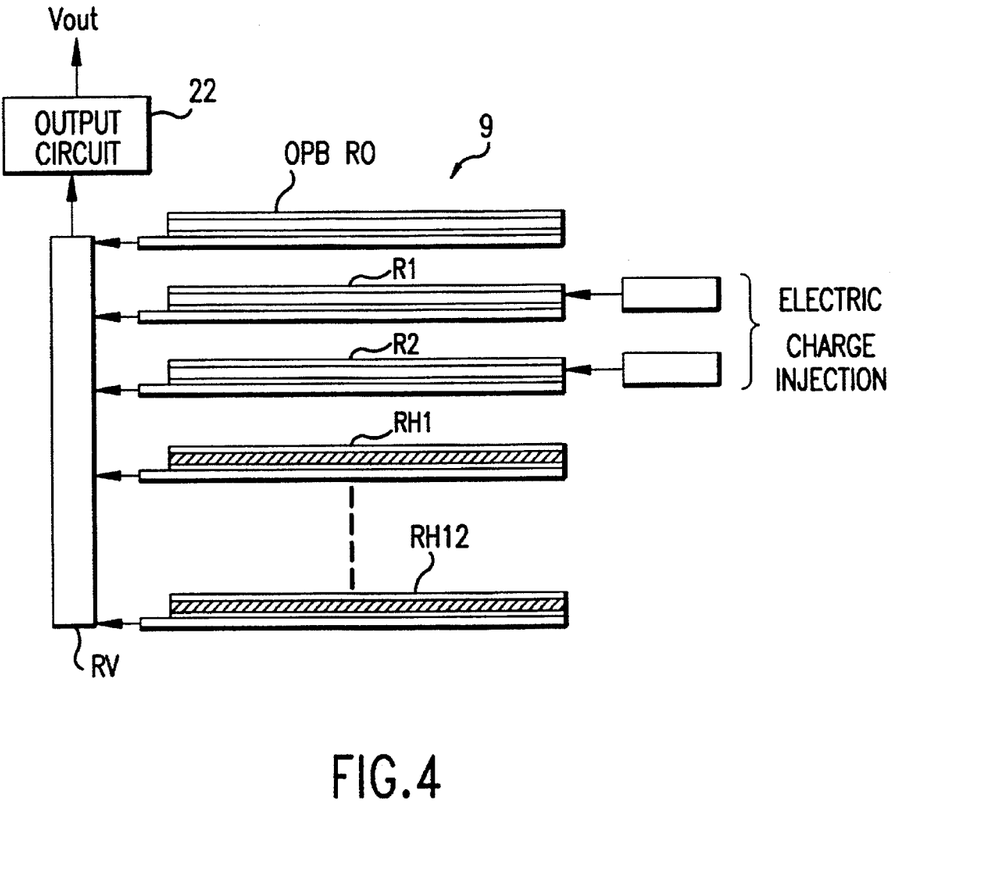
FIG. 4 is a drawing illustrating the light receiving element assembly's internal structure in the photometric device.

FIG. 4 shows the internal structure of the light receiving elements of light receiving element assembly 9. The light receiving element assembly 9 includes accumulation type elements, such as CCDs or the like, and at least three registers, an optically shielded OPB register RO (without a light receiving section), a first electric charge injection register R1, and a second electric charge injection register R2. The light receiving element assembly 9 also includes twelve H registers RH1–RH12 each having light receiving sections that conduct the photometry on the object.

Each of the registers, R0, R1, R2 and RH1–RH12, is connected with 20 independent pixel signal outputs. Photometric outputs are output from the registers through a register RV, which is preferably arranged perpendicular to the other registers, to an output circuit 22.

The output circuit 22 converts the outputs from the register RV into a voltage. The voltage is then output with a predetermined timing by magnifying the outputs from register RV one-fold during gain L and four-fold during gain H. Gain from the output circuit 22 can be switched by manipulation of the controller 20.

The OPB register RO includes a photoelectric conversion section that is optically shielded from the remainder of the optical system. The register R0 outputs a dark current component only, which is used during correction of a dark current component (described hereinafter) generated during accumulation of the light receiving element assembly 9.

The outputs from the first and the second electric charge injection registers, R1 and R2, are used at a later time to correct outputs from the light receiving element assembly 9. The first and the second electric charge injection registers R1 and R2 output constant electrical charge values, regardless of the object's brightness. The outputted constant values are selected for a predetermined correction. Their values may be equal or unequal.

Figure 5:
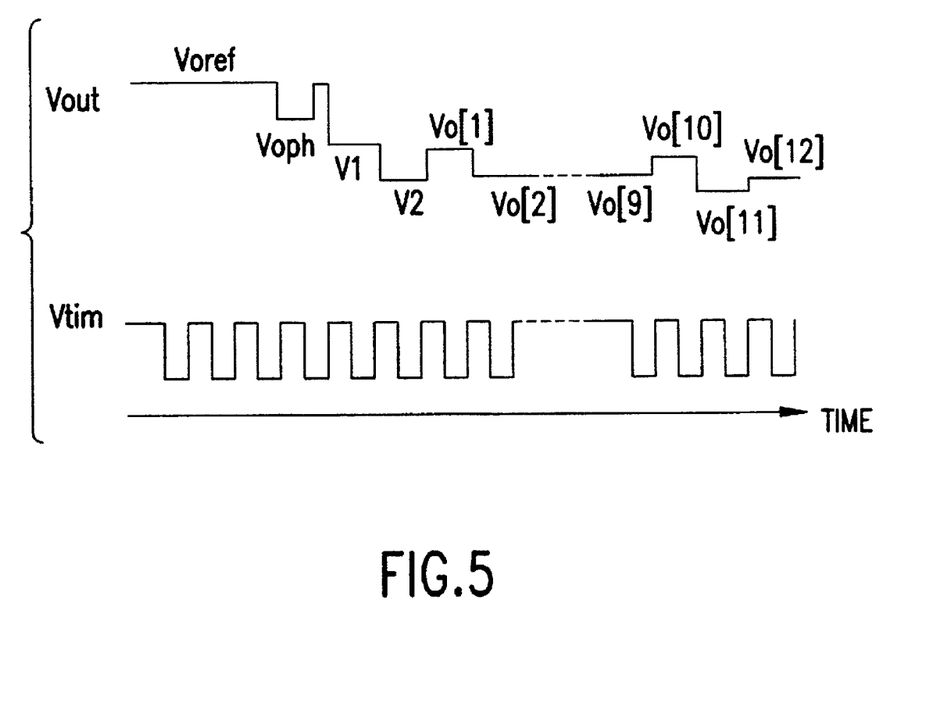
FIG. 5 is a graphical illustration of the output signal configuration from a light receiving element assembly of the photometric device.

FIG. 5 illustrates the configuration of the output signals over time from the light receiving element assembly of the photometric device. After synchronizing the fall Vtim of signals, the output from the light receiving element assembly 9 is corrected by reading output Vout signals. The first three pulses of the Vtim signals are "dummy outputs". The voltage level Voref (about 4 V) becomes the reference level for the light receiving element assembly 9.

The first and the second injection electric charge outputs V1, V2 and the outputs Vo(x) from each of the registers RH1–RH12 are output, equal to the difference from the reference level Voref for each pixel. The signal component for each output is output having a reference level of 0 in the direction of 0V. The output for a single pixel is completed by repeating this operation for 20 rows. A net signal component is then obtained by subtracting the signal level for the single pixel from the reference level. For example, if the reference level is 4 V and the signal output level is 3 V, the net signal component of the pixel is 1 V.

Figure 6:
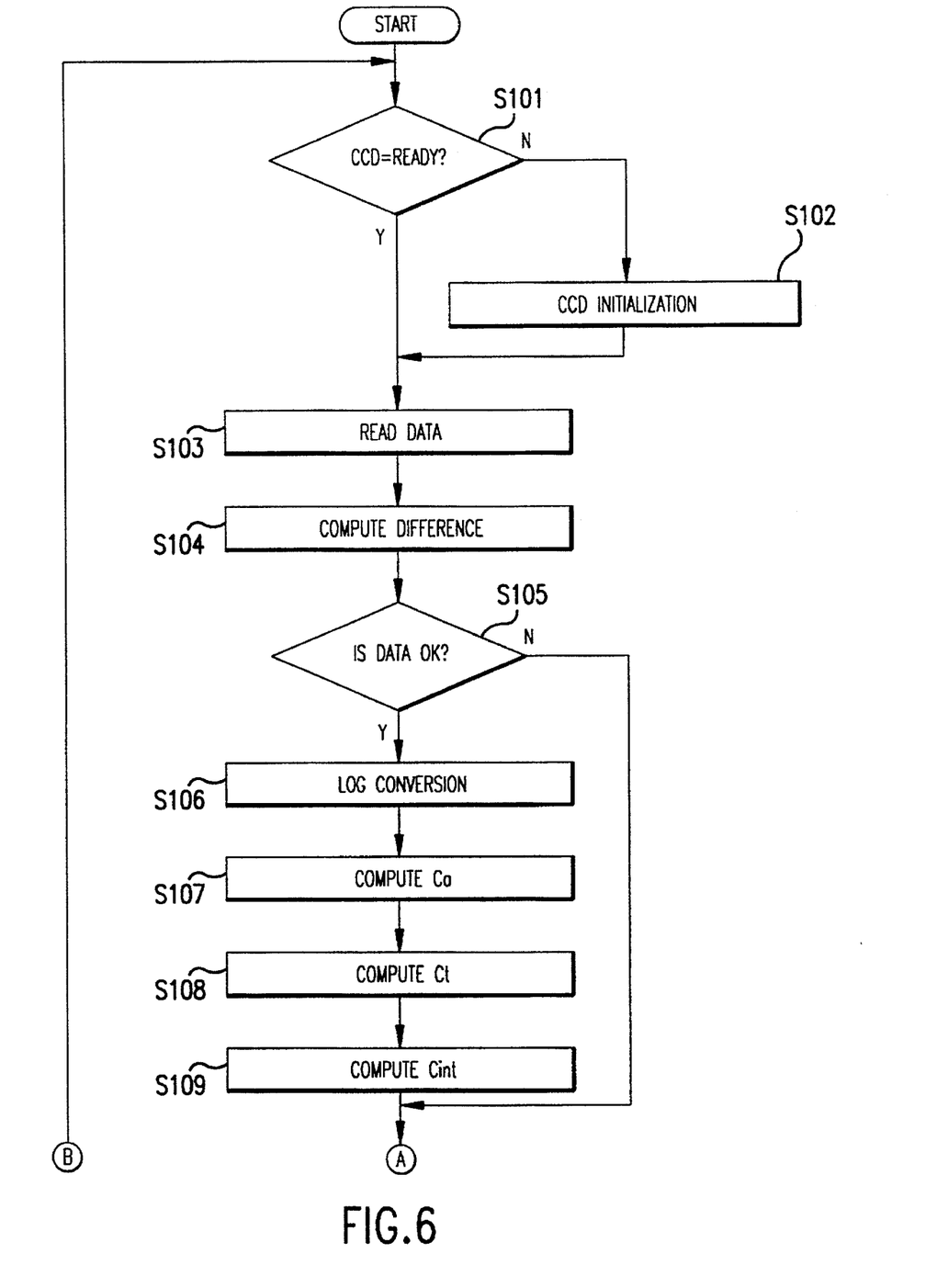
FIG. 6 is a flow chart illustrating the control routine of the photometric device.
Figure 7:
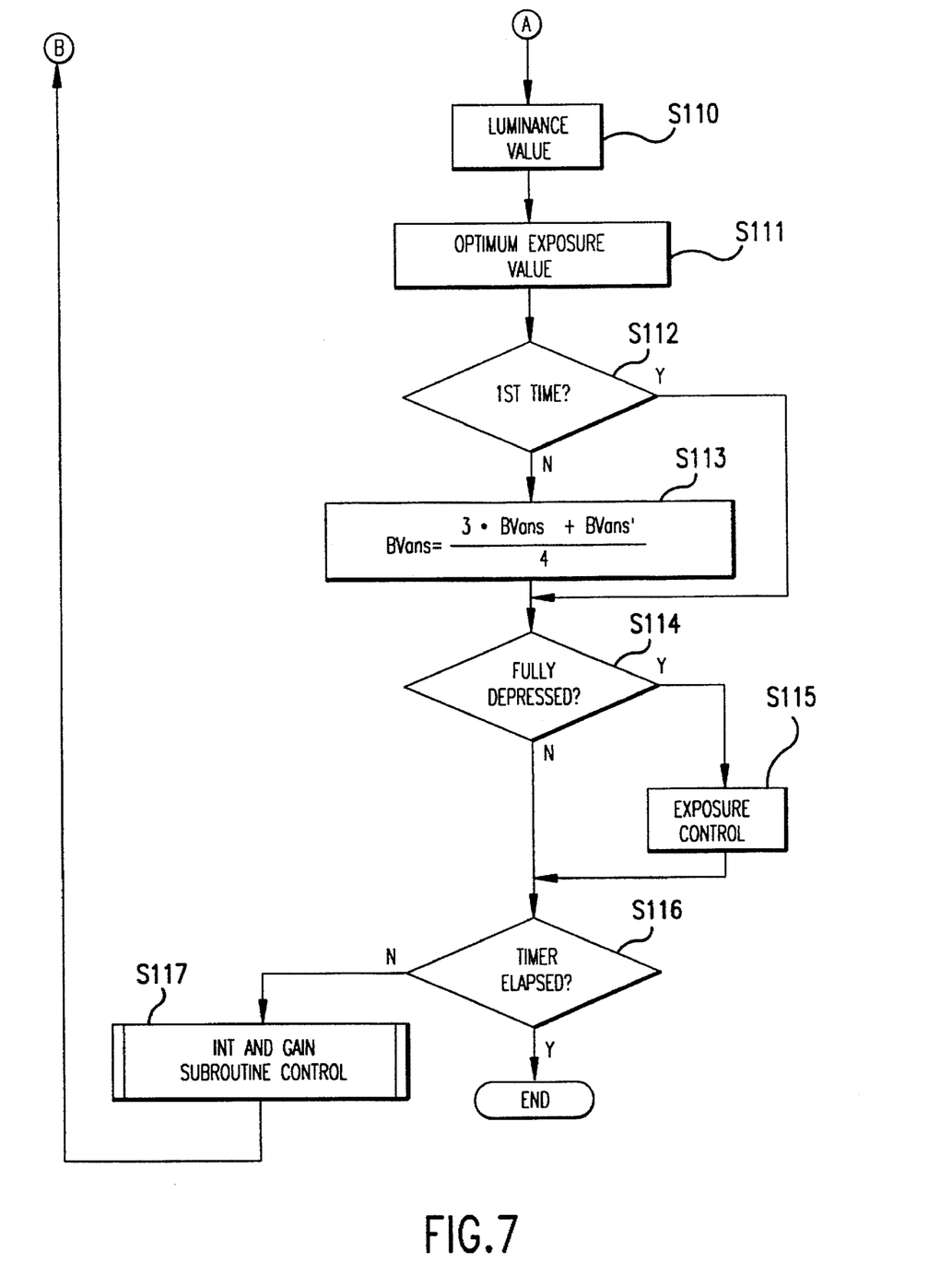
FIG. 7 is a continuation of the flow chart of FIG. 6.

FIGS. 6 and 7 are flow charts that describe the operation of the control routine of the controller 20 for the photometric device.

Initially, the power source of the camera is turned on by a half-depression of a camera's release button (not shown). This starts the main control.

First, the main control at step S101 determines whether the light receiving element assembly 9 has been initialized (CCD=ready?). If the receiving element 9 is not initialized, the control moves to step S102 and executes an initializing process, where unnecessary electric charge within the light receiving element assembly 9 is discharged.

If the initialization is complete, the control moves to step S103, where accumulated light in the light receiving element assembly 9 and photometric data is read by the A/D conversion section 14. For the first accumulation time, photometry is conducted with an appropriate value (1 ms, for example). The accumulation time and the gain for subsequent photometries are subsequentially determined at step S117, based on this first photometry value.

After the photometric data has been read, the control at step S104 computes a difference between the reference signals and each datum. The net photometric value RVx(n) is obtained using Equation (4).

$$RVx(n)=Voref(n)-Vx(n) \quad (4)$$

where, Vx is the photometric output and (n) indicates the row from which the data originates.

The control then proceeds to step S105 where the photometric data are examined to determine if it is within a photometric dynamic range. When Equations (5) and (6) are simultaneously satisfied, the data are within the photometric dynamic range and determined to be effective.

$$Vomax > Vmax\_min \quad (5)$$

$$Vomin < Vmin\_max \quad (6)$$

Here, Vomax and Vomin denote the maximum and the minimum values of the net signal component for the 240 photometric areas. Vmax_min and Vmin_max are obtained by subtracting the output signals from the reference voltage signals and are dependent on characteristics of the light receiving element assembly 9.

Vmax_min is the minimum value of the maximum values that appear to be reliable for signal outputs. Vmax_min is set as a value that does not affect subsequent photometry computations, even if the totality of signal outputs is below Vmax_min.

Conversely, Vmin_max is the maximum value of the minimum values that appear to be reliable for signal outputs. Vmin_max is set as a value that enables subsequent photometry computations, even if the totality of signal outputs is more than Vmin_max.

The control then proceeds to step S106, where logarithmic conversion of the photometric data for the 240 areas obtained at step S104 is conducted, using Equation (7).

$$LV(n, x)=Log\ (RV(n, x))/Log\ (2) \quad (7)$$

where RV(n, x) is data for the n-row by x-column, obtained at step S104, before logarithmic conversion (n=1 ... 20, x=1 ... 12). LV(n, x) is the data after logarithmic conversion.

The control then proceeds to step S107, where an amp gain correction coefficient Ca is calculated, using Equation (8).

$$Ca=V12-V12' \quad (8)$$

where V12' is the average values of V1(n) (n=1 ... 20) and V2(n) (n=1 ... 20), obtained at step S106, and V12 is V12', obtained at the time of luminance reclamation for the photometric device. V12' is stored in a nonvolatile memory of the photometric device.

The average values of V1(n) or V2(n) can be used in place of V12 and V12' to simplify the above computation. Moreover, to further simplify the computation, reclamation can use data from an arbitrary row, instead of computing the average value of the nth row.

From step S107, the control proceeds to step S108. The sensitivity correction value Ct is computed at step S108, using Equation (9).

$$Ct=Tg \cdot (t0-t) \quad (9)$$

where Ct is a coefficient that corrects sensitivity fluctuations due to temperature changes of the photoelectric conversion section, t0 is the temperature at the time of luminance reclamation of the photometry device, t is the temperature at the time of photometry and Tg is a constant numerical value of about 0.005. To obtain t, a circuit that detects temperature can be incorporated into the photometric device. Also, t can also be computed from the OPB output and the accumulation time because the OPB output of the light receiving element assembly 9 is a function of time. Further, suitable equivalent methods to obtain temperature may be used.

Next, the accumulation time correction coefficient Cint is obtained at step S109, using Equation (10).

$$Cint=Log\ (int0/int)/Log\ (2) \quad (10)$$

where int0 is the reference accumulation time (for example, 1 ms) and int is the accumulation time at photometry.

The control next proceeds to step S110, continued in FIG. 7, where the brightness or photometric values BV (n, x) of the 240 areas are obtained using Equation (11).

$$BV(n, x)=LV(n, x)+Ca+Ct+Cint+Cf0+Cg+Cz(n, x) \quad (11)$$

where LV(n, x) is the photometric data after logarithmic conversion obtained from Equation (7), Ca is the amp gain correction coefficient, Ct is the sensitivity correction coefficient, Cint is the accumulation time correction coefficient, Cg is the gain correction coefficient (gain H time=0, gain L time=2) of the light receiving element assembly output circuit and Cz(n, x) is the photometric error correction coefficient for each photometry area. All of the above values are separately computed for each separate lens based on data stored on the inside-lens controller 21.

Next, at step S111, an optimum exposure value for the object field is computed, using the luminance values of the 240 areas. The method of computing the optimum exposure value is explained in Japanese Unexamined Patent Publication 6-95200, the entire contents of which are herein incorporated herein by reference. Therefore, an explanation is omitted.

The control, at step S112, determines whether the photometry is the first photometry. If this is the first photometry, the control proceeds to step S114. Otherwise, the control program proceeds to step S113, where the photometric brightness value BVans is obtained using Equation (12).

$$BVans=(3 \cdot BVans+BVans')/4. \qquad (12)$$

The control then moves to step S114 and determines whether the release button has been fully depressed. If the button has been fully depressed, the control then moves to step S115, where an exposure of the film in the camera is conducted using the optimum exposure value obtained.

After the exposure in step S115, the control moves to step S116, to determine whether a timer embedded in the controller 20 has elapsed. If the timer has not elapsed, the control proceeds to step S117, where the accumulation time int and the gain of the output circuit for the next photometry time are obtained. The control then returns to step S101 to repeat the process. The control is completed if the timer has elapsed.

Figure 8:
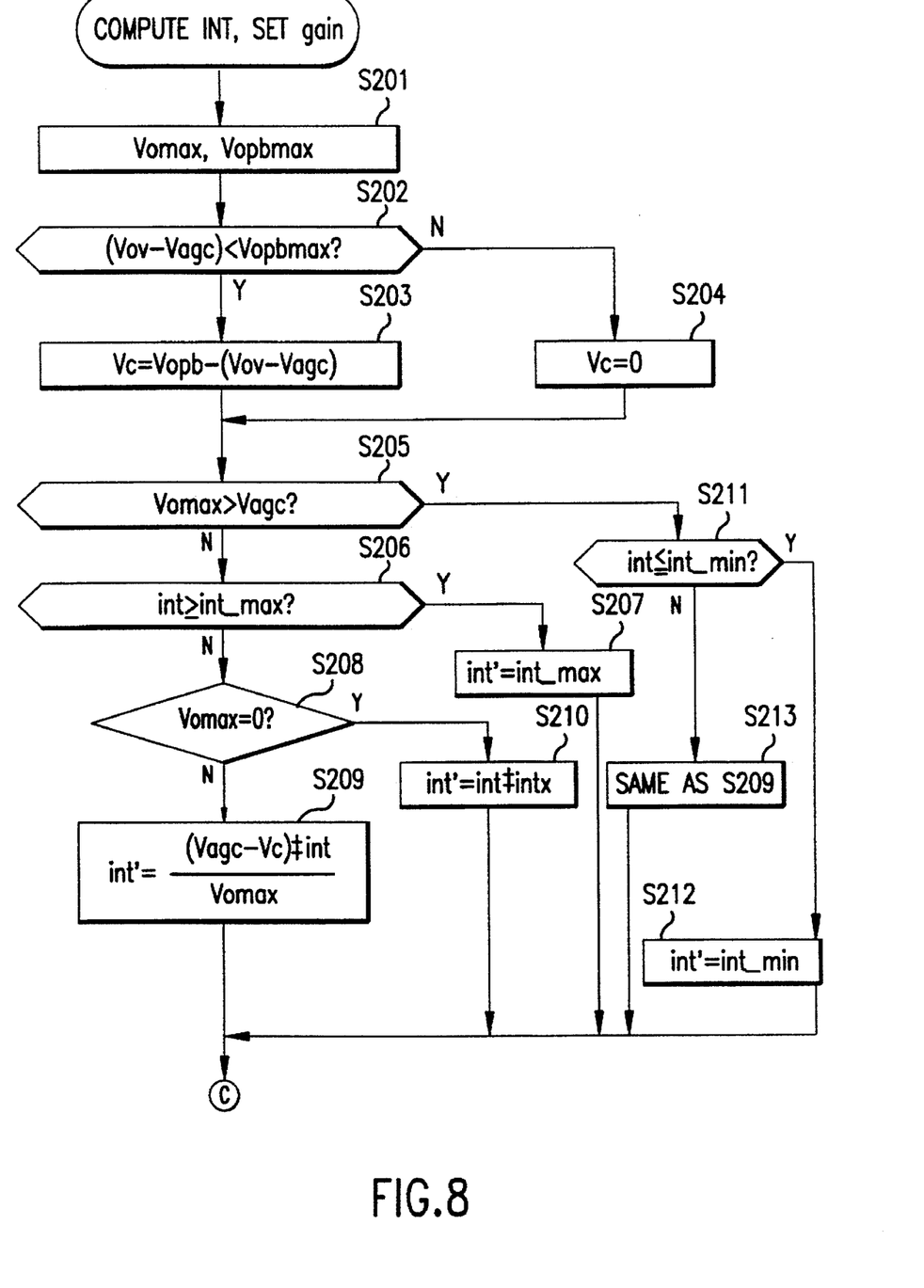
FIG. 8 is a flow chart illustrating a control subroutine determining the light receiving element assembly's amplifier gain in the photometric device.
Figure 9:
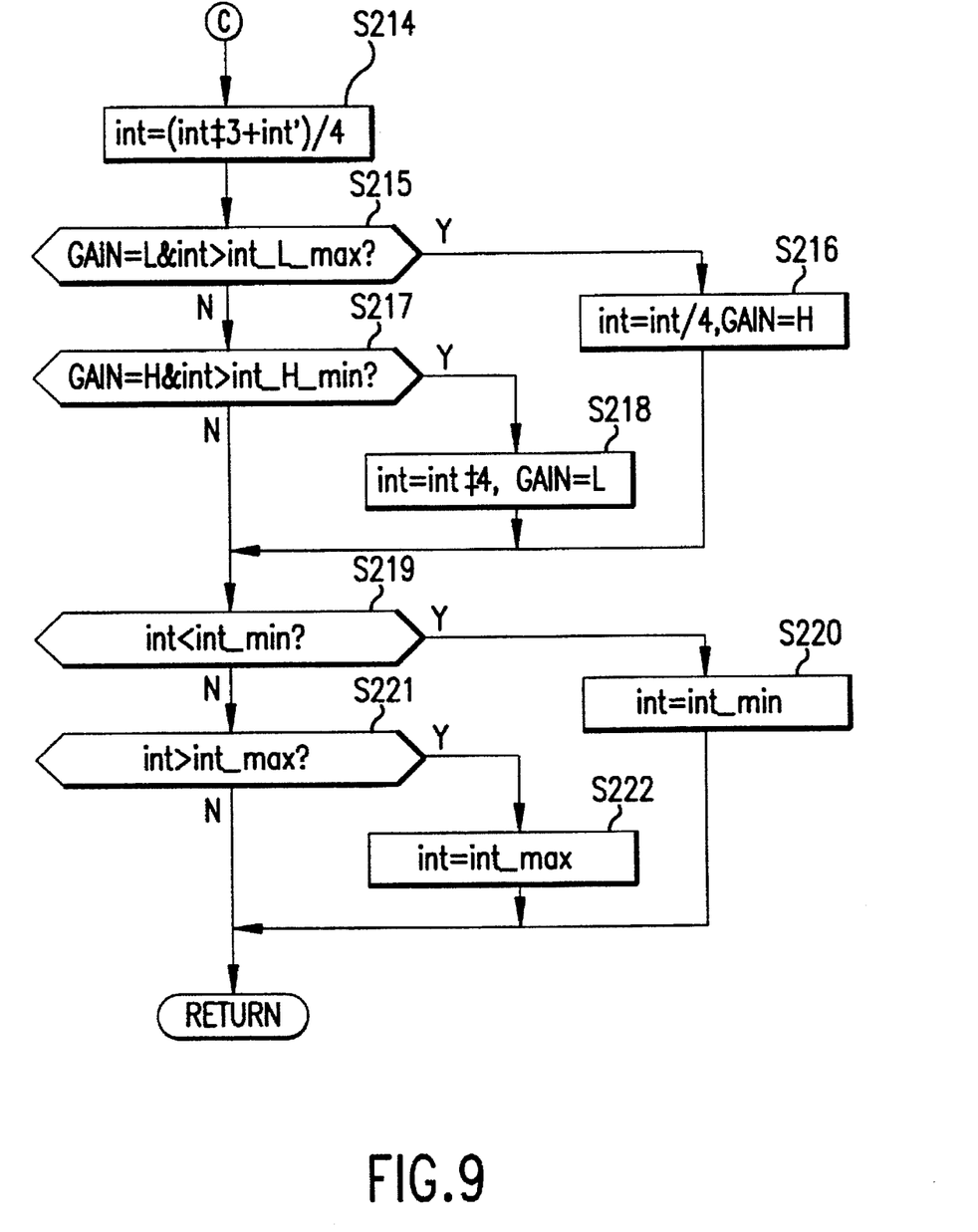
FIG. 9 is a continuation of the flow chart of FIG. 8.

The control subroutine at step S117 will be explained hereinafter. FIGS. 8 and 9 are flow charts that show the control subroutine at step S117 that determines the amplifier gain of the light receiving element assembly and accumulation time for the next photometry on the photometric device.

The control subroutine is called up and executed by the control at step S117. Photometry should be conducted at least once before the control subroutine is called up.

At step S201, the control subroutine obtains the maximum values Vomax and Vopbmax from the immediately preceding photometric value, which is stored within a memory of the controller 20. Vomax is the same value as the value obtained from Equation (5) and Vopbmax is the maximum value of the 20 net OPB outputs obtained in Equation (4).

At step S202, the control subroutine determines if the condition of Equation (13) is met.

$$(Vov-Vagc)<Vopbmax \qquad (13)$$

where Vov is the saturated value of the net output obtained from Equation (4) and Vagc is the targeted maximum output value. Vov and Vagc are determined by characteristics of the light receiving element assembly 9 and are generally around 3.4 V and 3 V, respectively. The output from the light receiving element assembly 9, due to its structural limitations, is such that the sum of the OPB component and the net signal component does not exceed the saturated value. Therefore, if the OPB output is too large, the dynamic range of the net signal component is narrow. If the condition of Equation (13) is satisfied, the OPB output becomes large while the dynamic range is small and the signal component may be saturated before reaching Vagc. Therefore, Vagc must be corrected.

If the condition of Equation (13) is satisfied, the control subroutine then moves to step S204. Correction value Vc of Vagc, is calculated using Equation (14).

$$Vc=Vopbmax-(Vov-Vagc) \qquad (14)$$

However, if Equation (13) is not satisfied, there are no errors or problems, and, thus, Vc is set to 0 at step S204.

The control subroutine then moves to step S205, where a determination is made whether the maximum value of the photometric data is larger than the AGC target level, using the inequality, Vomax>Vagc. If Vomax>Vagc, control subroutine moves to step S211. If Vomax>Vagc, the control subroutine moves to step S206.

At step S206, the control subroutine determines whether the previous accumulation time int is larger than the maximum accumulation time int_max, usually about 400 ms. If the condition in step S206, that the previous accumulation time int is larger than the maximum accumulation time int_max in step S206, the program moves to step S207. Otherwise, the subroutine control moves to step S208.

At step S207, the maximum value of the previous photometric data is below Vagc and the accumulation time is at a maximum. Therefore, at step S207, int_max is substituted as int' for the next accumulation time.

At step S208, the control subroutine checks if the Vomax=0. If Vomax=0, the control moves to step S210 and sets the next accumulation time as the product of int' and intx. If Vomax≠0 in step S208, the control subroutine moves to step S209 and int' is obtained using Equation (15).

$$int'=((Vagc-Vc) \cdot int)/Vomax \qquad (15)$$

If Vomax>Vagc, at step S205, the control subroutine moves to step S211. At step S211, the control subroutine determines whether the accumulation time int is below the minimum accumulation time int_min (generally about 10 μS). If the accumulation time int is below the minimum accumulation time int_min, the control subroutine then moves to step S212, and sets int'=int_min. If the accumulation time int is not below the minimum accumulation time int_min, the control subroutine moves to step S213, where int' is obtained using Equation (15).

The control subroutine moves from each of steps S209, S210, S212 and S213 to step S214. At step S214, the previous accumulation time weighted mean int is obtained using Equation (16) and the next accumulation time int'.

$$int=((int \cdot 3)+int')/4 \qquad (16)$$

The weighted mean is again substituted into int. For example, a weighted mean with three times the weight for the previous accumulation time can be used, however this value is adjustable. By permitting a hysteresis to remain on the previous accumulation time, instability of the accumulation time adjustment, due to flickering of the light source and the like, can be prevented.

The control subroutine next moves to step S215, where the subroutine control determines whether int, obtained in Equation (16), is greater than 100 ms using Equation (17).

$$gain=L \ \& \ int>int\_L\_max \qquad (17)$$

where L is the gain of the output circuit 22 in the light receiving element assembly 9. If int in Equation (16) is greater than 100 ms, the control moves to step S216. Step S216 sets the gain to H and reduces the accumulation time for the next accumulation to ¼ of the value found in Equation (16). This reduced accumulation time speeds up the photometry time because gain H is four times as much as gain L.

If int in Equation (16) is equal to or less than 100 ms, the subroutine control then moves to step S217. Step S217 determines whether int obtained in Equation (16) is less than 10 ms, using Equation (18)

$$\text{gain}=H \ \& \ int > int\_H\_\min \qquad (18)$$

where H is the gain. If int is less than 10 ms, the subroutine control moves to step S218 and sets the gain to L and the accumulation time to four times as much as the value in Equation (16) for the next accumulation. The ratio of the accumulation time to the photometry time is relatively small in either gain. Therefore, gain L is selected to have relatively little noise.

If the int determined in Equation (16) not less than 10 ms, the subroutine control moves to step S219. The subroutine control also moves from each of steps S216 and S218 to step S219. At step S219, the subroutine control determines whether int is below int_min. If int is below int_min, the subroutine control moves to step S220, where int is set to equal int_min.

If int is not below int_min, the subroutine control moves to step S221. At step S221, the subroutine control determines whether int exceeds int_max. If int exceeds int_max, the subroutine control moves to step S222 and sets int=int_max. The subroutine control then returns to main control at B.

The present invention is not limited to the embodiments described above, but alternatives, modifications and variations, are possible. For example, as described above, both logarithmic conversion and correction are conducted and each luminance value is computed for each of the 240 photometry areas. However, it is not necessary to compute the luminance value for each of the areas.

The multiplicity of photometry areas can be divided into groups or sub-groups for processing. For example, the average of the photometric output in a group or sub-group can be computed. The luminance value of each group can be obtained by conducting a logarithmic conversion and correction. These luminance values are then used to perform optimum exposure computations. By grouping the areas, the number of logarithmic conversions and corrections is reduced, resulting in a higher computation speed.

As described above, correction of photometric output is performed using a relatively simple computation method. Therefore, it is possible to obtain accurate photometric results, without overly burdening the correction section. Moreover, it is possible to output photometric values with no light source flicker effects without memorizing a multiplicity of photometric values. Therefore, burden on the control section is significantly reduced.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A photometric device comprising:

a photoelectric conversion section that converts light reflected from an object to signals;

an output circuit coupled to the photoelectric conversion section that converts analog outputs of said photoelectric conversion section into digital data and outputs said digital data;

a logarithmic conversion section coupled to the output circuit that logarithmically compresses the digital data from the output circuit; and a correction section coupled to the logarithmic conversion section that corrects the digital data from the output circuit, wherein the correction section corrects the data from the output circuit after the data are logarithmically compressed by the logarithmic conversion section.

2. The device according to claim 1, wherein the correction section corrects any error in the data of the output circuit caused by temperature.

3. The device according to claim 1, wherein the correction section corrects any error in the data of the output circuit caused by changes in a voltage of a power source.

4. The device according to claim 1, wherein the correction section corrects any sensitivity changes of the photoelectric conversion section caused by temperature.

5. The device according to claim 1, wherein the output circuit outputs at least a first and a second data and a difference between the at least first and second data outputs is determined before the at least first and second data are compressed logarithmically.

6. The device according to claim 5, wherein the at least first and second data output from the output circuit comprise a reference voltage and at least one photometric output, and a difference between the reference voltage and the at least one photometric output is determined before the reference voltage and at least one photometric output are logarithmically compressed.

7. The device according to claim 6, wherein the output circuit comprises at least one terminal and the output circuit outputs the reference voltage and at least one photometric output from the same terminal.

8. The device according to claim 1 wherein, the photometric section includes accumulation photoelectric elements.

9. A photometric device comprising:

a photometric assembly that conducts photometry on an object;

a control connected to the photometric assembly that repeatedly conducts photometry at a predetermined interval;

a determiner connected to the control that determines whether the current photometry is the first photometry after start-up of a power source; and a photometry result computation section connected to the determiner that is capable of outputting two distinct values, the photometry result computation section outputting the photometric value as the final photometric result if photometry conducted by the photometric section is the first photometry, based on the determination result of the determiner, and the photometry result computation section outputting a weighted mean of a previous final photometric result and the current photometric value if the current photometry is not the first photometry.

10. The device according to claim 9, wherein the photometric section includes accumulation photoelectric elements.

11. A photometric device comprising;

photoelectric means for converting light reflected from an object to signals;

means, connected to the photoelectric converting means, for converting analog outputs of said photoelectric conversion section into digital data and outputting said digital data;

means, connected to the outputting means, for logarithmically compressing the digital data from the output means; and means, connected to the logarithmically compressing means, for correcting the digital data from the outputting means, wherein the correcting means corrects the output from the outputting means after the data are logarithmically compressed by the logarithmically compressing means.

12. The device according to claim 11, wherein the correcting means corrects any error in the data of the outputting means caused by temperature changes.

13. The device according to claim 11, wherein the correcting means corrects any error in the data of the outputting means caused by changes in a voltage of a power source.

14. The device according to claim 11, wherein the correcting means correct any sensitivity changes of the photoelectric conversion means caused by temperature changes.

15. The device according to claim 11, wherein the outputting means outputs at least a first and a second data and a difference between the at least first and second data is determined before the at least first and second data are logarithmically compressed.

16. The device according to claim 15, wherein the at least first and second data output from the outputting means outputs a reference voltage and at least one photometric output and a difference between the reference voltage and the at least one photometric output is determined before the reference voltage and at least one photometric output are logarithmically compressed.

17. The device according to claim 11, the outputting means comprises at least one terminal and wherein the outputting means outputs the reference voltage and the at least one photometric output from the same terminal.

18. The device according to claim 11 wherein, the photoelectric means includes accumulation photoelectric elements.

19. A photometric device comprising:

means for conducting photometry on an object;

means, connected to the means for conducting photometry, for controlling that repeatedly conducts photometry at a predetermined interval;

means, connected to the controlling means, for determining whether the current photometry is the first photometry after start-up of a power source; and means, connected to the determining means, capable of outputting two distinct values, the means outputting the photometric value as the final photometric result if the photometry is the first photometry based on the determining means, and the means outputting a weighted mean of the previous final photometric result and the current photometric value if the current photometry is not the first photometry.

20. A photometry method comprising the steps of:

converting light reflected from an object to signals;

logarithmically compressing the signals; and correcting signals, after the signals are logarithmically compressed.

21. The method according to claim 20, wherein the correcting step includes correcting the data of any error caused by temperature.

22. The method according to claim 20, wherein the correcting step includes correcting the data if any sensitivity changes are caused by temperature in the converting step.

23. The method according to claim 20, wherein the correcting step includes correcting the data of any error caused by changes in a voltage of a power source.

24. The method according to claim 20, wherein the signals comprise at least two signals and a difference between the at least two signals is computed before the at least two signals are compressed logarithmically.

25. The method according to claim 24, wherein the at least two signals comprise a reference voltage and at least one photometric output and a difference between the reference voltage and the at least one photometric output is computed.

26. A photometric method comprising the steps:

repeatedly conducting photometry on an object at a predetermined interval;

determining whether the current photometry is the first photometry after start-up of a power source; and outputting the photometric value as the final photometric result, if the photometry is the first photometry, and outputting a weighted mean of the previous final photometric result and the current photometric value, if the photometry is not the first photometry.

* * * * *